April 29, 1930.  T. M. EYNON  1,756,347
LIQUID LEVEL INDICATOR
Filed March 31, 1921
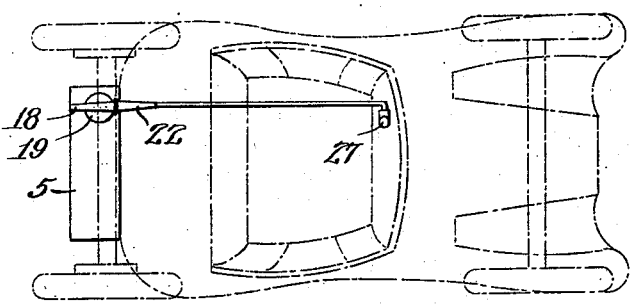
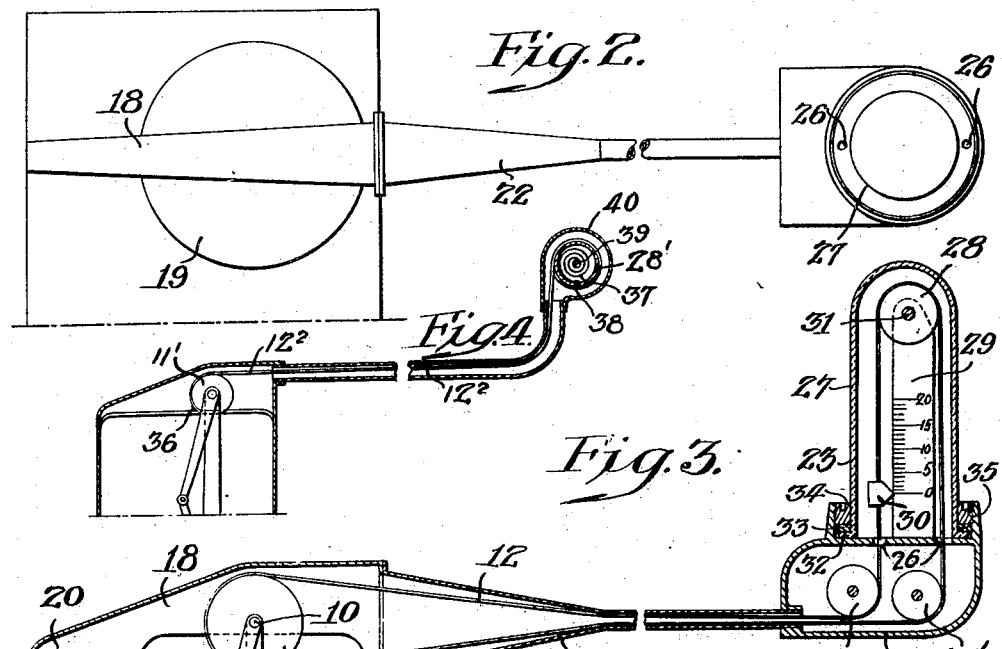
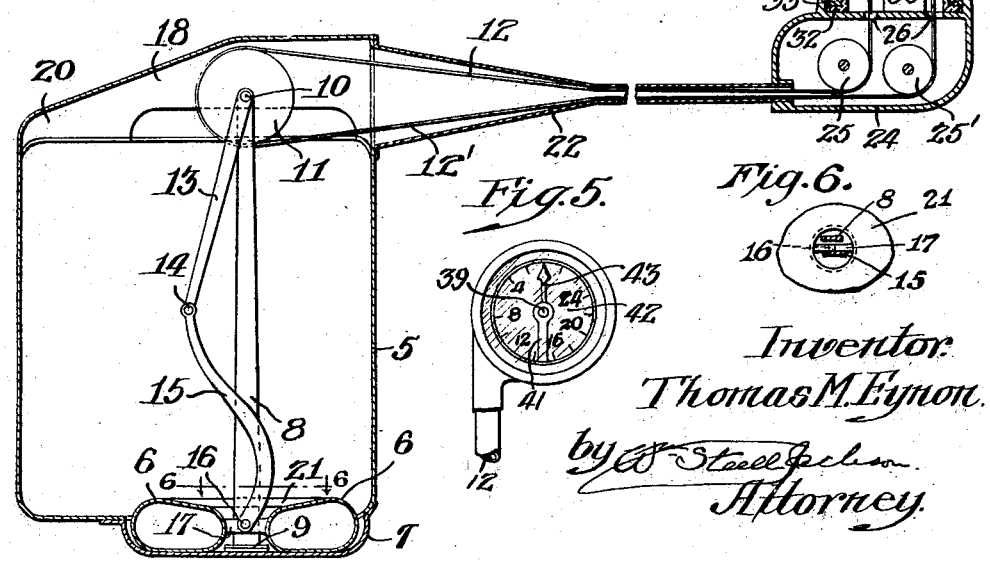
Inventor
Thomas M. Eynon.
by W. Steel Jackson
Attorney.

Patented Apr. 29, 1930

1,756,347

UNITED STATES PATENT OFFICE

THOMAS M. EYNON, OF PHILADELPHIA, PENNSYLVANIA

LIQUID-LEVEL INDICATOR

Application filed March 31, 1921. Serial No. 457,277.

My invention relates to indicating mechanism for showing at the dash-board the height of gasoline in an automobile tank.

The purpose of my invention is to provide a belt-operated indicator in which the belt is moved by a float in the tank.

A further purpose is to cause rotation of a pulley from the float in the tank and to transmit the pulley movement into dash-board indication by a belt.

A further purpose is to mount an endless indicator belt at the dash-board and connect it with turning mechanism float-operated from the tank.

Further purposes will appear in the specification.

I have preferred to illustrate my invention by a few forms only, among the various forms in which it may appear, selecting forms which are practical, efficient, reliable and inexpensive and which at the same time well illustrate the principles of my invention.

Figure 1 is a top plan view in outline of an automobile with one form of my invention applied to it diagrammatically.

Figure 2 is a broken top plan view showing the tank, indicator base and connections.

Figure 3 is a broken vertical elevation through the tank and an indicator of my preferred form.

Figures 4 and 5 are a fragmentary section of the upper end of a modified device and a fragmentary side elevation of the indicator thereof showing this other form.

Figure 6 is a section of the float corresponding to the position of line 6—6 of Figure 3.

In the drawing similar numerals indicate like parts.

Mechanical connection of the tank members and the indicator offers one considerable advantage in that the indicator is not interrupted by leakage of fluid and the operation is positive. Though the indication may be made directly proportionate to the gasoline depth in the tank, this is not essential and in the present form has been disregarded, since the instrument can be calibrated to give accurate readings though the indications be not uniformly spaced.

In the illustration a typical tank is shown at 5. My invention is wholly independent of any pressure or vacuum conditions which may exist in it.

Within the tank I place a float 6 which is shown as fitting conveniently within a depressed bottom 7, so as to indicate down to the bottom of the tank. Obviously this depression is not necessary where the extreme lower ranges are not desired.

I find it convenient and desirable, though not essential, to use a hollow ring form of float and to guide it by a central rod 8 anchored at 9. The same rod is used also to support at its upper end the shaft 10 for a wheel 11 having any suitable driving surface. This serves as a transmission wheel for a belt which may be any band 12. The wheel is oscillated with movement of the float through the medium of an arm 13 connected rigidly with the shaft 10 at one end. The shaft 10 is rigidly connected with the wheel. The arm 13 is pivoted at the other end at 14 to an arm 15 pivotally secured at 16 to a strap 17 upon the float.

The most convenient form of construction to accommodate the wheel 11 is to extend the top of the tank transversely by an inverted gutter 18, and the upper part of the tank is preferably raised at 19 above the float to permit the float to indicate the upper range of gasoline height in the tank.

The inverted gutter 18 may be extended to the left in the figures to some such point 20 in order to provide room for extension of the arms 13 and 15 within it at the upper ranges of float movement, and the upper surface of the float may be dished as at 21, so that the wheel and belt may not interfere with movement of the float.

These several elements of tank, float and lever construction are details in a broad invention in which the major factors are a guided float and mechanical connections by which the movement of the float is transmitted into rotation of the belt wheel.

The belt stretches 12, 12′ extend through the connections 22, with suitable relief from excessive friction, as by rounding the turns and by guiding idler wheels where needed, to an indicator 23 at a convenient point, preferably at the dashboard of the automobile. It will be obvious that these connections may turn or bend, that no question of location of the indicator above or below the tank enters into their operation and that the desirability of enclosing them against leakage of gasoline is much increased where pressure exists in the tank.

At the indicator I show the belt stretches as entering within a base 24 and as guided upwardly by idlers 25, 25' through openings 26 into the gauge 27 where the belt passes about the idler 28.

The separation of the gauge into the base 24 and indicating section 27 is a matter of convenience because I prefer to make the upper member of glass which is not so desirable for the base. Whether the upper member be of glass or merely have a sight opening in it, I provide a scale 29 which is calibrated to cooperate with the pointer 30 carried by one of the stretches of the belt. The scale is shown as marked upon the mount or standard for the shaft 31 by which idler 28 is supported.

The lower part of the member 27 is flanged at 32 and is held in position and at the same time the joint is sealed against leakage by packing 33 forced to place by a threaded ring 34 screwed into the threaded flange 35 formed on the top wall of the base 24.

In operation, lifting of the float by reason of flow of gasoline into the tank causes the link 15 to move upwardly throwing the arm 13 upwardly and outwardly and turning the disc 11 in a clockwise direction, with the result that the stretch 12 of the belt moves upwardly carrying the pointer 30 over the scale. With return of the float, as the tank empties, a reverse operation takes place, bringing the pointer 30 down toward the zero point.

I recognize that the function of the lower stretch 12' of the belt is to retract the upper stretch of the belt when the latter is slackened and that the same function and relation of operative parts could be effected in Figure 3 without the lower stretch if the belt were fastened to the wheel 11 and used as a flexible connection with other means of retraction. One other such retracting means is seen in spring-controlled wheel 28' in Figure 4. At the same time this form of connection makes it very convenient to use a form of indicator shown in Figures 4 and 5, where the flexible connection 12² is secured to the pulley wheel at some such point as 36 and is pulled positively in counter-clockwise direction by the wheel 11'. However, during the clockwise movement of this wheel, shown in Figure 4, the slack of the belt is taken up by the pulley 28'. The face in this pulley may then itself carry an indicator of the type shown in Figure 5.

The flexible connection 12² is wrapped about the wheel 28' and constant tension is exerted upon it to wind it up or to oppose unwinding movement (to the left in the figure) by a spring 37 within the wheel, secured to the wheel at its outer end at 38 and to a fixed pivot 39 at its inner end. The wheel and flexible connection are enclosed within a casing 40, one of whose ends and arm 41 may carry the pin.

The ends of the roller bear upon a fixed arm 41 and one of them may carry an indicator disc 42 to cooperate with a fixed pointer 43. This indicator construction corresponds throughout to the Bajus form.

In operation the movement of the wheel 11' to the left turns upon the flexible connection 12² and then winds this connection from the wheel 28' reducing the reading upon the indicator. Then the wheel 11' turns in a clockwise direction, slackening the flexible connection, the slack is taken up by clockwise movement of the wheel 28' due to the spring 37 with the result that the indicator disc carried by this wheel 28' turns past the fixed pointer to show the quantity of gasoline within the tank.

It will be obvious that all or a part of my invention may be presented in other forms, as appeals to the whim or need of those skilled in the art; and it is my purpose to include all such forms within my invention as come within its reasonable spirit and scope.

Having thus described my invention, what I claim as new and desire to secure by Letters Patent is:—

1. In an automobile indicator for gasoline depth, a gasoline tank, a float therein, a guide for the float attached to and carried within said tank, a wheel above the float supported for rotation by said guide, connections between the float and wheel whereby said wheel is rotated upon upward and downward movement of the float, a remotely positioned indicator housing, an endless belt engaging and operated by said wheel and extending to said housing, idler wheels and a pulley wheel in and supported for rotation by said housing and engaging the belt to stretch and guide it, and a pointer carried by said belt for movement within the housing to show by its position the position of the float.

2. In an automobile indicator for gasoline depth, a gasoline tank, a float therein, a guide for the float attached to and carried within said tank, a wheel above the float supported for rotation by said guide, connections between the float and wheel whereby said wheel is rotated upon upward and downward movement of the float, a belt about the wheel, idlers for the belt, a pulley engaged by the belt and holding the belt in stretched position, an indicating scale between one of the idlers and the pulley, an indicator housing positioned exteriorly of said tank and forming a support for said pulley, idlers and scale, and a pointer carried by the belt and cooperating with the scale.

3. In an automobile indicator for gasoline depth, a tank, a float-operated wheel, a support for the wheel, a belt carried by the wheel, an indicator base, a pair of idlers rotatably supported in the base, a casing resting upon the base and transparent in one portion, packing for the casing, a pulley rotatably supported within the casing adapted to be rotated by said belt and a pointer carried by the belt and visible through the casing.

4. In an automobile indicator for gasoline depth, a tank, a float in said tank, a guide for the float supported in said tank, a wheel rotatably mounted at the upper end of said guide, an arm connected with said wheel to rotate the wheel, a second arm pivotally connected with the float at one end and with the first arm at the opposite end to turn said wheel with lifting movement of the float, a belt engaging the surface of the wheel so as to be operated upon rotation of said wheel, supports for the belt and an indicator connected with the belt and adapted to be operated by it.

5. In an automobile indicator for gasoline depth, a tank, a float in said tank, a vertical guide for the float supported in said tank, a wheel rotatably mounted at the upper end of the guide, connections between the wheel and float whereby the wheel is rotated upon vertical movement of the float, a belt engaging the surface of the wheel, and idler and pulley supports for the belt to keep it taut, and an indicator connected with the belt to show the full position by the position of the indicator.

THOMAS M. EYNON.